(12) United States Patent
Iida et al.

(10) Patent No.: US 7,888,825 B2
(45) Date of Patent: Feb. 15, 2011

(54) WORKER SAFETY MANAGEMENT SYSTEM

(75) Inventors: Tatsuya Iida, Kyoto (JP); Manabu Shutto, Osaka (JP); Hiroaki Furukawa, Kasugai (JP); Toshiki Koshi, Tokyo (JP); Takashi Tanaka, Kadoma (JP)

(73) Assignees: Omron Corporation, Kyoto-Shi (JP); Idec Corporation, Osaka-Shi (JP); Sunx Limited, Kasugai-Shi (JP); Yamatake Corporation, Tokyo (JP); Panasonic Electric Works Co., Ltd., Kadoma-Shi (JP)

(*) Notice: Subject to any disclaimer, the term of this patent is extended or adjusted under 35 U.S.C. 154(b) by 290 days.

(21) Appl. No.: 11/817,305

(22) PCT Filed: Jul. 12, 2006

(86) PCT No.: PCT/JP2006/313854
§ 371 (c)(1),
(2), (4) Date: Nov. 13, 2008

(87) PCT Pub. No.: WO2007/010795
PCT Pub. Date: Jan. 25, 2007

(65) Prior Publication Data
US 2009/0072631 A1 Mar. 19, 2009

(30) Foreign Application Priority Data
Jul. 19, 2005 (JP) .............................. 2005-208922

(51) Int. Cl.
*H02H 11/00* (2006.01)
(52) U.S. Cl. .................................................... 307/326
(58) Field of Classification Search ................. 307/326, 307/328; 340/5.6, 5.64, 5.7; 235/382, 382.5
See application file for complete search history.

(56) References Cited

U.S. PATENT DOCUMENTS 7,317,377 B2 * 1/2008 Galperin et al. ............ 340/5.64

FOREIGN PATENT DOCUMENTS

JP 61-151710 7/1986

(Continued)

OTHER PUBLICATIONS

Lili Du et al., "Gatecontrol Management System Based on RFID Card," Journal of Beijing Technology and Business Un iversity (Natural Science Edition), vol. 21, No. 1, Dec. 2003, pp. 22-26.

*Primary Examiner*—Jared J Fureman
*Assistant Examiner*—Carlos Amaya
(74) *Attorney, Agent, or Firm*—Foley & Lardner LLP

(57) ABSTRACT

Task—To provide a worker safety management system that can adapt itself to changes in the conditions of the workers and the machines in a flexible manner and can finely manage the safety of the worker.
Means to Achieve the Task—Worker safety is managed by using safety management information stored in an ID tag. The safety management information includes a work area code indicating a work area permitted to the corresponding worker and a danger avoiding capability code indicating a danger avoiding capability of the worker. The danger avoiding capability indicated by the danger avoiding capability code is determined from a worker skill of the corresponding worker that is evaluated in a standardized manner from past work experience of the corresponding worker and credits earned in a safety education program, and a specific degree of danger in the work area permitted to the worker.

9 Claims, 13 Drawing Sheets

| | FOREIGN PATENT DOCUMENTS | | JP | 2001-270700 | 10/2001 |
|----|----|----|----|----|----|
| JP | 09-272096 | 10/1997 | | | |
| JP | 2001-160534 | 6/2001 | * cited by examiner | | |

Fig.6

| tags | worker skill code | worker name (20 character-length) | work area code | danger evading capability code | work item code |
|---|---|---|---|---|---|
| tag 1 | A | Taro Yamada | 1 | 1 | machine maintenance robot teaching |
| tag 2 | B | Kazuo Sato | 1 | 2 | general maintenance cleaning work |
| tag 3 | C | Masao Suzuki | 2 | 1 | machine maintenance robot teaching |
| tag 4 | D | Shiro Takahashi | 3 | 2 | general maintenance cleaning work |

Fig.7

| tags | worker skill code | worker name (20 character-length) | work area code | danger evading capability code | work item code |
|---|---|---|---|---|---|
| tag 1 | A | Taro Yamada | 1 | 1 | machine maintenance |
| | | | | | robot teaching |

(a) Example based on work areas

| tags | worker skill code | worker name (20 character-length) | work area code | danger evading capability code | work item code |
|---|---|---|---|---|---|
| tag 1 | A | Taro Yamada | 1 | 1 | machine maintenance |
| | A | Taro Yamada | 1 | 2 | robot teaching |
| | A | Taro Yamada | 2 | 2 | machine maintenance |
| | A | Taro Yamada | 2 | 3 | robot teaching |
| | A | Taro Yamada | 3 | 2 | robot teaching |

(b) Examples based on combinations of work areas and work items

*Fig.8*

| source of danger \ state | standstill | preparation /teaching | operation |
|---|---|---|---|
| robot | 1 | 2 | 3 |
| press | 1 |  | 3 |
| conveyer | 1 |  | 2 |

(a) Degree of danger lookup table (work area 1)

| source of danger \ worker | Yamada (robot operation) | Sato (cleaning) |
|---|---|---|
| robot | 3 | 1 |
| press | 3 | 1 |
| conveyer | 2 | 1 |

(b) Danger evading capability for each worker for each different machine (work area 1)

Fig.9

| | state | degree of danger | Yamada's danger evading capability | Sato's danger evading capability |
|---|---|---|---|---|
| robot | teaching | 2 | 3 (◇ degree of danger) | 1 (≪ degree of danger) |
| conveyer | operation | 2 | 3 (◇ degree of danger) | 1 (≪ degree of danger) |
| press | standstill | 1 | 2 (◇ degree of danger) | 1 (≪ degree of danger) |

⇐ entry permitted

⇐ entry refused

WORKER SAFETY MANAGEMENT SYSTEM

TECHNICAL FIELD

The present invention relates to a worker safety management system for use in a work place including a delimited work area where a work machine that could be a source of danger is placed.

BACKGROUND OF THE INVENTION

In manufacturing environments, work places in most cases include specifically designated work areas which are each bounded by a protective fence or the like for placing therein a work machine such as a large robot for welding, picking or other work and a machining center that could be a source of danger.

In such a work place, it has been conventionally practiced to use a worker safety management system for establishing an interlocking relationship between the entry/exit of a worker into and out of the designated work area, identified by the use of a mechanical key or a card key, and the operation of the work machine within the designated work area, with the aim of preventing the worker from encountering any danger within the work area. See Patent Document #1 and #2.

For such a worker safety management system to be able to ensure the safety of the worker and improve and maintain the work efficiency, it is essential that information is closely exchanged between the work machine and the worker.

[Patent Document #1]

Japanese patent laid open (kokai) publication No. 2001-160534

[Patent Document #2]

Japanese patent laid open (kokai) publication No. 2001-270700

BRIEF SUMMARY OF THE INVENTION

Tasks to be Accomplished by the Invention

However, in such a conventional worker safety management system, because the medium for exchanging information was limited to the mechanical key or card key, it was not possible to manage worker safety in such a fine manner as to distinguish the particular workers and/or the particular work areas because of the shortage in the amount of information that can be exchanged.

Also, because such a conventional worker safety management system was designed and operated by evaluating the danger avoiding skill of each worker only in a standardized way from the past experience of the worker and the worker skill qualification earned by taking a prescribed course of lectures and assuming the level of danger of each work machine to be fixed without regard to the operating condition of the machine and the contents of the performed work, the system was not able to fully account for changes in the conditions of the workers and the work machines so that there was a room for improvement in preventing accidents in the work area.

The present invention was made in view of such problems of the conventional worker safety management systems, and has a primary object to provide a worker safety management system that can adapt itself to changes in the conditions of the workers and the machines in a flexible manner and can finely manage the safety of the worker.

Other objects and advantages of the present invention will become more apparent for a person skilled in the art from the following description.

Means to Accomplish the Task

The worker safety management system of the present invention consists of a worker safety management system for managing worker safety in a work place including a designated work area where a work machine that could be a source of danger is placed.

The "work machine" as used herein may include various forms of robots for welding, picking, material working, assembling or the like and machining centers that can be fitted with various tools in an interchangeable manner. The "delimit" as used herein may be implemented in variously different forms of barriers depending on the particular work machine. For instance, in the case of a robot for welding and picking, such a work area may be delimited by a protective fence. In the case of a machining center, a certain work area which may be considered as a "delimited work area" is defined by the machining center itself. The "protective barrier" as used herein may mean such barriers as a light curtain (multiple beam photoelectric switch) that may have no mechanical or physical barrier function. The "worker" as used herein may mean not only workers in a narrow sense such as the operator of a particular work machine but also other personnel who may be assigned with the task of cleaning, replacing component parts and repairing.

This system may comprise an ID tag that is carried by each worker and stores safety management information for the particular worker carrying the ID tag, one or more ID tag readers that are placed in suitable parts of the work area for reading the safety management information on the corresponding worker from the ID tag carried by the particular worker, and a safety management control device for executing a control action on the safety management of each worker according to the safety management information read from the corresponding ID tag by using the ID tag reader.

The "ID tag" as used herein means a data carrier incorporated with memory (such as semiconductor memory) for storing information and given with a read/write function which may be performed in either with or without contact. A non-contact read/write function may be implemented not only by those using radio wave as a communication medium such as the RFID tag but also by those using any other communication media such as infrared radiation and ultrasonic sound. The "ID tag reader" as used herein may be implemented in various different forms which may be either a contact or non-contact type. The "suitable part of the work place" for installing the ID tag reader may be selected that is conveniently located for the worker for the particular work involved. In what shape the ID tag may be formed and how it may be carried by the worker may be determined from those known to be convenient for the worker to carry. The "control on safety management of each worker" as used herein includes not only the control for managing the access to the work area and the control on the operation of a work machine but also any other modes of control that are required for the safety management of the worker, as can be readily appreciated.

The safety management information stored in each ID tag includes at least a work area code indicating a work area permitted to the corresponding worker and a danger avoiding capability code indicating a danger avoiding capability of the worker, and the danger avoiding capability indicated by the danger avoiding capability code is determined from a worker skill of the corresponding worker that is evaluated in a standardized manner from past work experience of the corresponding worker and credits earned in a safety education program, and a specific degree of danger in the work area permitted to the worker.

There are a number of ways to assign a work area code to each worker. For instance, when a particular worker is assigned to three work areas A1, A2 and A3, a single work area code (C1) covering these work areas may be assigned to the worker, or, alternatively, a separate work area code (C11, C12 and C13) may be assigned to the work for each work area.

There are a number of ways to assign a danger avoiding capability code also. For instance, when the particular worker is given with a worker skill code of S1, a work area code of C1 and a work item code of W1 (single) considering the kind of work that is expected in the corresponding work area, a single unique danger avoiding capability G1 of the worker can be determined from these three pieces of information.

On the other hand, when the particular worker is given with a worker skill code of S1, work area codes of C1, C12 and C13 and work item codes of W11, W12 and W13, considering the kind of work that is expected in each corresponding work area, three danger avoiding capabilities G11, G12 and G13 of the worker can be determined from the valid combinations of these three pieces of information (the worker skill, work areas and work items).

Similarly, when the particular worker is given with a worker skill code of S1, work area codes of C111, C112 and C113 and work item codes of (W111, W112 and W113), (W121, W122 and W123) and (W131, W132 and W133), considering the kinds of work that are expected in each corresponding work area, nine danger avoiding capabilities G111, G112, G113, G121, G122, G123, G131, G132 and G133 of the worker can be determined from the valid combinations of these three pieces of information by considering the possible work items in each work area.

According to the structure described above, because ID tags are used as media for exchanging information between the work machines and the worker, it is possible to exchange safety management information between the two sides in a highly fine manner. Furthermore, because the safety management information includes a work area code indicating a work area permitted to the corresponding worker and a danger avoiding capability code indicating a danger avoiding capability of the worker, the danger avoiding capability of the worker being determined from a worker skill of the corresponding worker that is evaluated in a standardized manner from past work experience of the corresponding worker and credits earned in a safety education program, and a specific degree of danger in the work area permitted to the worker, it becomes possible to finely manage the worker safety according to these codes by taking into account the changes in the states of the work machines and workers.

According to a preferred embodiment of the present invention, the safety management control unit comprises: a worker presence information generating means for generating worker presence information of a work area including a work machine according to records of worker entry and worker exit; a worker absence control means that is executed when no worker presence is determined from the worker presence information generated by the worker presence information generating means; and a worker presence control means that is executed when worker presence is determined from the worker presence information generated by the worker presence information generating means; whereby safety of the worker is ensured when issuing any of a start operation command, a stop operation command and a change operation mode command.

The worker absence control means permits a worker an access to a work area provided that the worker is verified to be permitted to work in the work area according to the worker's work area code and that a danger avoiding capability indicated by the worker's danger avoiding capability code is equal to or higher than a degree of danger associated with a work machine included in the work area; and the worker presence control means permits a worker an access to a work area provided that the worker is verified to be permitted to work in the work area according to the worker's work area code and that a danger avoiding capability indicated by the worker's danger avoiding capability code is equal to or higher than a danger avoiding capability indicated by a danger avoiding capability of another worker already present in the work area based on the worker presence information generated by the worker presence information generating means.

According to this arrangement, when there is no preceding worker in the work area, a new worker is permitted to enter the work area if the danger avoiding capability of the new worker is equal to or higher than the degree of danger of the work machine at the particular time point. More specifically, because the degree of danger of a work machine changes depending on the state thereof at each particular time point (standstill, teaching and in operation), it becomes possible to finely manage the safety of the worker by comparing the danger avoiding capability of the work who is about to enter the work area with the degree of danger of the work machine at the particular time point. When the work area contains a plurality of work machines (such as a work robot, a press and a conveyer), the degree of danger may be defined for each work machine. In such a case, the danger avoiding capability may be assigned to each worker for each work machine. The degree of danger of each work machine and the danger avoiding capability code of each work may be given with a common dimension so that they may be compared with each other. More specifically, the degree of danger of each work machine can be numerically evaluated by using an evaluation method such as a risk assessment. The danger avoiding capability of a worker for each kind of danger can be determined by a system administrator according to results of qualifying tests and amounts of experience.

When a preceding worker is already present in the work area, a new worker who is about to enter the work is permitted to enter the work area if the danger avoiding capability of the new worker is equal to or higher than that of the worker already present in the work area. This determination process was adopted because the danger avoiding capability of the worker already present in the work area reflects the degree of danger of the associated work area. If the worker who is about to enter the work area has a higher danger avoiding capability than the worker already present in the work area, even when the preceding worker performs work involving a high degree of danger, the new worker would be able to avoid any danger that could be caused thereby.

As discussed above, because the danger avoiding capability is determined from a worker skill of the corresponding worker that is evaluated in a standardized manner from past work experience of the corresponding worker and credits earned in a safety education program, and a specific degree of danger in the work area permitted to the worker, the worker entry control conducted in this manner is a highly appropriate one, and harmonizes productivity and safety.

If the work place comprises a work machine such as a robot and a machine tool, a protective barrier that delimits and surrounds the work area including the work machine and a gate provided in a part of the protective barrier and configured to be switched between a passable state and a non-passable state, a worker may be permitted an access to the work area by placing the gate in the passable state.

According to another preferred embodiment of the present invention, the safety management control unit comprises: a worker presence information generating means for generating worker presence information of a work area including a work machine according to records of worker entry and worker exit; a worker absence control means that is executed when no worker presence is determined from the worker presence information generated by the worker presence information generating means; and a worker presence control means that is executed when worker presence is determined from the worker presence information generated by the worker presence information generating means; whereby safety of the worker is ensured when issuing any of a start operation command, a stop operation command and a change operation mode command.

The worker absence control means enables a start operation command, a stop operation command and a change operation mode command of the work machine; and the worker presence control means enables a start operation command, a stop operation command and a change operation mode command of the work machine for a change to an operation mode involving a lower degree of danger but prohibits a change operation mode command of the work machine for a change to an operation mode involving a higher degree of danger.

According to this arrangement, when no preceding worker is present in the work area, a start operation command, a stop operation command and a change operation mode command of the work machine are all enabled. On the other hand, when a preceding worker is present in the work area, a start operation command, a stop operation command and a change operation mode command of the work machine for a change to an operation mode involving a lower degree of danger are enabled, but a change operation mode command of the work machine for a change to an operation mode involving a higher degree of danger is prohibited so that a change to an operation mode involving a higher degree of danger is enabled without vacating the work area each time, and this results in an appropriate entry control that harmonizes productivity with safety.

According to a certain aspect of the present invention, there is provided a method for managing worker safety in a work place including a delimited work area containing a work machine that could be a source of danger according to safety management information stored in an ID tag carried by each worker.

In this case, the safety management information stored in each ID tag includes at least a work area code indicating a work area permitted to the corresponding worker and a danger avoiding capability code indicating a danger avoiding capability of the worker, and the danger avoiding capability indicated by the danger avoiding capability code is determined from a worker skill of the corresponding worker that is evaluated in a standardized manner from past work experience of the corresponding worker and credits earned in a safety education program, and a specific degree of danger in the work area permitted to the worker.

The method comprises a worker presence information generating step of generating a worker presence information of the work area containing the work machine according to records of worker entry and worker exit; a worker absence control executing step of executing a worker absence control when a worker absence is determined from the worker presence information generated by the worker presence information generating step; and a worker presence control executing step of executing a worker presence control when a worker presence is determined from the worker presence information generated by the worker presence information generating step.

The worker absence control executing step permits a worker an access to a work area provided that the worker is verified to be permitted to work in the work area according to the worker's work area code and that a danger avoiding capability indicated by the worker's danger avoiding capability code is equal to or higher than a degree of danger associated with a work machine included in the work area. The worker presence control executing step permits a worker an access to a work area provided that the worker is verified to be permitted to work in the work area according to the worker's work area code and that a danger avoiding capability indicated by the worker's danger avoiding capability code is equal to or higher than a danger avoiding capability indicated by a danger avoiding capability of a worker already present in the work area based on the worker presence information generated by the worker presence information generating means.

The work place contains a work machine such as a robot and a machine tool, a protective barrier that delimits and surrounds a work area containing the work machine and a gate provided in a part of the protective barrier and configured to be switched between a passable state and a non-passable state, a worker being permitted an access to the work area by placing the gate in the passable state.

According to another aspect of the present invention, there is provided a method for managing worker safety in a work place including a delimited work area containing a work machine that could be a source of danger according to safety management information stored in an ID tag carried by each worker.

In this method, the safety management information stored in each ID tag includes a work area code indicating a work area permitted to the corresponding worker and a danger avoiding capability code indicating a danger avoiding capability of the worker, and the danger avoiding capability indicated by the danger avoiding capability code is determined from a worker skill of the corresponding worker that is evaluated in a standardized manner from past work experience of the corresponding worker and credits earned in a safety education program, and a specific degree of danger in the work area permitted to the worker.

Additionally, the method comprises a worker presence information generating step of generating a worker presence information of the work area containing the work machine according to records of worker entry and worker exit; a worker absence control executing step of executing a worker absence control when a worker absence is determined from the worker presence information generated by the worker presence information generating step; and a worker presence control executing step of executing a worker presence control when a worker presence is determined from the worker presence information generated by the worker presence information generating step.

The worker absence control executing step enables a start operation command, a stop operation command and a change operation mode command of the work machine; and the worker presence control executing step enables a start operation command, a stop operation command and a change operation mode command of the work machine for a change to an operation mode involving a lower degree of danger but prohibits a change operation mode command of the work machine for a change to an operation mode involving a higher degree of danger.

EFFECT OF THE INVENTION

According to the present invention, because ID tags are used as media for exchanging information between the work machines and the worker, it is possible to exchange safety management information between the two sides in a highly fine manner. Furthermore, because the safety management information includes a work area code indicating a work area permitted to the corresponding worker and a danger avoiding capability code indicating a danger avoiding capability of the worker, the danger avoiding capability of the worker being determined from a worker skill of the corresponding worker that is evaluated in a standardized manner from past work experience of the corresponding worker and credits earned in a safety education program, and a specific degree of danger in the work area permitted to the worker, it becomes possible to finely manage the worker safety according to these codes by taking into account the changes in the states of the work machines and workers.

DETAILED DESCRIPTION OF THE PREFERRED EMBODIMENT(S)

A preferred embodiment of the worker safety management system according to the present invention is described in the following with reference to the appended drawings.

First of all, a work place to which the system of the present invention is applied is described in the following with reference to FIGS. 10 to 13. As shown in these drawings, this work place includes a work area 100 delimited by a protective fence 16. Substantially centrally placed in this work area 100 is a large robot 15a that can be used for various types of work, such as welding, picking, material working and assembling. In the illustrated embodiment, a press 15b for working work pieces and a conveyer 15c for transporting work pieces are installed adjacent to the robot 15a.

An access gate 13 is provided in a part of the protective fence 16 for gaining access into the work area. The illustrated gate 13 is provided with a small hall 101 that extends from the work area 100 and is provided with a door 13a. The door 13a is resiliently urged in the closing direction by a biasing means such as a spring not shown in the drawings, and is automatically locked by a solenoid lock mechanism 8 once it is closed. The solenoid lock mechanism 8 can be locked and unlocked remotely. The part of the small hall 101 connecting to the work area 100 is provided with a light curtain 7 (multi beam photoelectric sensor) for detecting a worker passing through this area. The light curtain 7 is used for detecting the entry and exit of a worker.

In front of the gate 13 is placed an entry tag reader 4 for reading safety management information from a RFID tag carried by a worker who is about to enter the work area 100 and necessarily passes through this area for gaining entry into the work area 100. Immediately inside the gate 13 is placed an exit tag reader 5 for reading safety management information from a RFID tag carried by a worker who is about to exit the work area 100 and necessarily passes through this area for leaving the work area 100.

Adjacent to the gate 13 is placed a control console 14 that accommodates a safety management control unit (SC), a robot control unit or the like. The control console 14 is provided with an operator tag reader 3 at a position suitable for an operator to operate. The operator tag reader 3 enables the safety management information contained in the RFID tag carried by the operator to be read.

FIG. 1 shows the overall structure of the worker safety management system embodying the present invention. As shown in this drawing, the system comprises a programmable controller (PLC) 1, an operation display unit 2 serving as a man/machine interface for the PLC, a revolving warning light 9, a buzzer 10, an emergency stop switch 11 and a RFID tag 12 carried by each worker, in addition to the operator tag reader 3, the entry tag reader 4, the exit tag reader 5, the robot control unit 6, the light curtain 7 and the solenoid lock mechanism 8.

The PLC 1 is a central component in the worker safety management control unit (SC) of the present invention. The various functions of the worker safety management control unit (SC) can be achieved by feeding prescribed user programs (as shown by the flowcharts of FIGS. 3 to 5) that are prepared by using a user language such as a ladder chart and a function block diagram into the worker safety management control unit (SC). The illustrated safety management control unit (SC) is implemented by combining the PLC 1 with the robot control unit 6, but can also be similarly implemented by using a dedicated safety management PLC incorporated with a safety management control function.

The operation display unit 2 is provided with the function of a control panel for operating the robot. More specifically, by touching the operation display unit 2, various commands such as start operation, end operation and mode switch-over can be entered. When any one of such commands is enabled by an operation process (whose functions are shown in the flowchart of FIG. 5) which is described hereinafter, a corresponding signal is forwarded from the PCL 1 to the robot control unit 6 and the corresponding mode of operation is executed by the robot control unit 6.

Reading of the safety management information from the RFID tag 12 carried by the worker is effected by using any one of the operator tag reader 3, entry tag reader 4 and exit tag reader 5, and this establishes a communication between the worker and the work machine such as a robot. The operator tag reader 3 and entry tag reader 4 may be embedded in the upper or lateral side of the control console 14 as illustrated in FIG. 2, and the exit tag reader 5 may be installed on the inner side of the protective fence 14 adjacent to the access gate 13 or immediately inside the door 13a. The revolving warning light 9, buzzer 10 and emergency stop switch 11 may be incorporated in the control console 14. Arrow A in FIG. 2 indicates the direction of entry into the work area.

The solenoid lock mechanism 8 is mounted so as to correspond to the door 13a of the gate 13 when the door 13a is closed as illustrated in FIG. 2, for instance. The door 13a is normally closed, and the solenoid lock mechanism 8 is locked in such a state. When the solenoid lock mechanism 8 is unlocked remotely, the door 13a can be opened manually. Once the worker has passed through the door 13a, the door 13a is automatically closed under a resilient force of a biasing means, and is then automatically locked.

The RFID tag 12 includes semiconductor memory that stores the safety management information on the safety of the worker. FIG. 6 shows a table that lists the safety management information of each worker. In this example, the contents of the safety management information in four tags 1 to 4 corresponding to four workers (Taro Yamada, Kazuo Sato, Masao Suzuki and Shiro Takahashi) are compared.

As shown in the drawing, the safety management information on each worker includes five attributes represented by a worker skill code, a worker name, a work area code, a danger avoiding capability code and a work item code.

The worker skill indicated by the worker skill code (A, B and C) is defined in a standardized manner according to the past work experience and credits earned in safety education programs, such as worker skill 1 (operation), worker skill 2 (operation+management), worker skill 2 (maintenance) and worker skill 4 (manufacturing technology). Therefore, the worker skill identified by a worker skill code merely indicates a generalized capability of the corresponding worker to avoid danger.

The work area identified by the work area code (1, 2 and 3) indicates the worker area in which the worker carrying the corresponding tag is allowed to work. There are a number of possible ways to assign a work area code to each worker. In the case illustrated in FIG. 6, even though each worker may be assigned with a plurality of permitted work areas, a single work area code may be assigned to a group of work areas, such as work area code 1 (robot 1), work area code 2 (robots 1 and 2) and work area 3 (entire plant).

The work item identified by the work item code represents an item of work permitted to the particular worker. In the illustrated embodiment, a single item code may be assigned to a group of work items, such as work item code 1 (machine maintenance and robot teaching) and work item code 2 (general maintenance and cleaning work).

The danger avoiding capability indicated by a danger avoiding capability code (1 and 2) is an essential part of the present invention, and is determined by taking into account the specific "degree of danger" in the "work area" permitted to the particular worker, as well as the "worker skill" that is determined in a standardized manner from the past work experience and credits earned from safety education programs. The specific "degree of danger" in the "work area" as used herein is determined by considering a situation where the work item designated by the work item code is performed in the work area designated by the work area code.

In other words, the danger avoiding capability indicated by a danger avoiding capability code is determined by considering the degree of danger when a worker having a worker skill specified by a worker skill code performs work specified by a work item code in a work area designated by a work area code. In this example, the higher the numerical value of the danger avoiding capability code is, the higher the danger avoiding capability is.

More specifically, in the case of a worker, Taro Yamada who carries a tag 1, the danger avoiding capability code is set to "1" by taking into consideration the fact that the skill code of the worker is A, the work area code is "1" and the work item code is "machine maintenance and robot teaching".

Similarly, in the case of another worker, Taro Yamada, who carries a tag 2, the danger avoiding capability code is set to "2" by taking into consideration the fact that the skill code of the worker is B, the work area code is "1" and the work item code is "general maintenance and cleaning work".

Similarly, in the case of yet another worker, Masao Suzuki, who carries a tag 3, the danger avoiding capability code is set to "1" by taking into consideration the fact that the skill code of the worker is C, the work area code is "2" and the work item code is "machine maintenance and robot teaching".

Similarly, in the case of yet another worker, Shiro Takahashi, who carries a tag 4, the danger avoiding capability code is set to "2" by taking into consideration the fact that the skill code of the worker is D, the work area code is "3" and the work item code is "general maintenance and cleaning work".

Another method for generating a danger avoiding capability code is illustrated in FIG. 7. In the case of the example illustrated in FIG. 6, as illustrated in FIG. 7a, each worker is assigned only a single work area code and a single work item code so that there is only one danger avoiding capability code for each worker.

On the other hand, if two or more work area codes are assigned to each worker and a work item code is assigned to each work area, as a danger avoiding capability code can be generated from each combination of a work area code and a work item code, each worker may be assigned with two or more danger avoiding capability codes.

More specifically, for instance, as illustrated in FIG. 7b, when a worker, Taro Yamada, carrying a tag 1 performs work designated by a work item code "machine maintenance" in a work area designated by a work area code "1", a danger avoiding capability "1" is determined from the worker skill code "A", work area code "1" and work item code "machine maintenance".

Similarly, when a worker, Taro Yamada, carrying a tag 1 performs work designated by a work item code "robot teaching" in a work area designated by a work area code "1", a danger avoiding capability code "2" is determined from the worker skill code "A", a work area code "1" and work item code value of "robot teaching".

According to the method of generating a danger avoiding capability code illustrated in FIG. 7b, because each worker may be given with a danger avoiding capability code for each combination of a work area and a work item, a worker safety management can be carried out in a finely tuned manner by utilizing a plurality of danger avoiding capability codes thus generated.

The mode of operation of the safety management control process using the RFID tags is described in the following. FIG. 3 is a flowchart showing the overall process flow of the worker safety management system, FIG. 4 is a flowchart showing the details of the entry control process, and FIG. 5 is a flowchart showing the details of the system operation process.

The functions implemented by the various processes of these flowcharts are achieved by feeding user programs prepared by using a ladder chart language and function blocks into the PLC1 illustrated in FIG. 1 as can be readily appreciated by a person skilled in the art.

Referring to FIG. 3, upon start of the control process, an ID tag search process (step 301) is executed and the presence of an ID tag is monitored (step 302) so that the system is put into the state of awaiting the arrival of a worker (step 302).

As such a time, when a worker approaches any one of the operator tag reader 3, entry tag reader 4 and exit tag reader 5 in the work place illustrated in FIGS. 10 to 13, the ID tag carried by the worker is detected (yes in step 302), and it is determined which of an entry/exit mode or an operation mode is requested depending on which of the tag readers the signal comes from (step 303).

If it is a case of an entry/exit mode operation (entry/exit in step 303), the tag information is read and stored (step 304), and it is determined if the worker is entering or exiting the work area depending on if the signal is from the entry tag reader 4 or from the exit tag reader 5. If it is a case of entry (entry in step 305), an entry process (step 306) which is one of essential parts of the present invention is executed, and the system flow then advances to the worker presence information update process (entry) (step 307). Upon completion of this process, the system flow returns to the initial state of awaiting an arrival of an ID tag (steps 301 and 302). On the other hand, when it is determined that it is a case of an exit (exit in step 305), the worker presence information update process (exit) is executed (step 308) and, upon completion of this process, the system flow again returns to the initial state of awaiting an arrival of an ID tag (steps 301 and 302).

In the worker presence information update process (entry) (step 307), the name of the worker read from the RFID tag 12 is registered in a prescribed present worker list. In the worker presence information update process (exit) (step 308), the name of the corresponding worker is removed from the present worker list. The worker presence information is updated in this manner.

If an operation mode is determined in the determination process of step 303 (operation mode in step 303), a tag information reading process (step 309) is executed and an operation process (step 310) which is one of the essential features of the present invention is executed. Upon completion of this process, the system flow returns to the initial state of awaiting an arrival of an ID tag (steps 301 and 302).

The details of the aforementioned entry process (step 306) are illustrated in FIG. 4. Upon start of the process illustrated in FIG. 4, it is determined if the worker is permitted to enter the work area from the work area code (step 400). If the worker is not permitted to enter the work area, the access permitting process (step 408) is skipped and the control flow ends. On the other hand, if the worker is permitted to enter the work area (yes in step 400), the worker presence information is looked up (step 401) and the presence of a worker within the work area 100 is determined (step 402).

If it is determined that no worker is present (no in step 402), the degrees of danger of the sources of danger (the robot 15a, press 15b and conveyer 15c in the embodiment illustrated in FIGS. 10 to 13) in the work area is looked up. This look up process is executed by using a degree of danger reference table shown in FIG. 8a.

Referring to FIG. 8a, the degree of danger of each source of danger (robot, press and conveyer) changes with the changes in the state of the particular source of danger. In the case of the illustrated embodiment, if the source of danger consists of a robot, the degree of danger of the robot is "1" when the robot is standstill, "2" when the robot is being prepared and being taught, and "3" when the robot is fully in operation. In this example, the greater the number is, the greater the level of danger is. Similarly, when the source of danger is a press, the degree of danger is "1" when the press is standstill and "2" when the press is in operation. Therefore, the degree of danger of each source of danger is determined in the process of step 409 depending on the kind of the source of danger and the state of the source of danger.

Once the degree of danger is determined for each source of danger, the danger avoiding capability (B) of the worker who is about to enter the work area is read (step 410). In the illustrated embodiment, the danger avoiding capability (B) of each worker is defined as given in the table of FIG. 8b. More specifically, the danger avoiding capability of Mr. Yamada who is in charge of operating a robot is "3" with regard to robots, "3" with regard to presses and "2" with regard to conveyers. Similarly, the danger avoiding capability (B) of Mr. Sato who is in charge of cleaning is "1" with regard to robots, "1" with regard to presses and "1" with regard to conveyers. In this case also, the greater the number is, the higher the danger avoiding capability is.

Once the danger avoiding capability of the worker who is about to enter the work area is determined, the degree of danger (C) of each source of danger is compared with the danger avoiding capability (B) of the worker (step 411). The details of this comparing process (step 411) are described in the following with reference to FIG. 9.

FIG. 9 shows a table listing results of determining if each particular worker is permitted to enter a work area "1". As shown in the table, the degree of danger of the robot is "2" because it is being taught, the degree of danger of the conveyer is "2" because it is in operation, and the degree of danger of the press is "1" because it is standstill.

In this case, the danger avoiding capability of Mr. Yamada (who is assigned to a work area "1") is "3" (which is higher than the current degree of danger) with regard to the robot, "3" (which is higher than the current degree of danger) with regard to the conveyer, and "2" (which is higher than the current degree of danger) with regard to the press. Therefore, his danger avoiding capability is higher than the current degree of danger of any of the sources of danger (no in step 412 and yes in step 413) and the access permitting process (step 408) is executed. In other words, Mr. Yamada is permitted to enter the work area.

In the work permitting process (step 408), the solenoid lock mechanism 8 is released, and the door 13a of the access gate 13 is allowed to be opened manually. When the worker enters the work area by opening the door 13a under this condition, it is detected by the light curtain and the solenoid lock mechanism 8 is locked again so that the door 13a now cannot be manually opened any more.

On the other hand, the danger avoiding capability of Mr. Sato (who is assigned to a work area "1") is "1" (which is lower than the current degree of danger) with regard to the robot, "1" (which is lower than the current degree of danger) with regard to the conveyer, and "1" (which is lower than the current degree of danger) with regard to the press. Therefore, his danger avoiding capability is lower than the current degree of danger any of the sources of danger (no in step 412 and no in step 413) and the access permitting process (step 408) is not executed. In other words, Mr. Yamada is refused to enter the work area.

If presence of a plurality of workers is determined in the determination process of step 402 (yes in step 402), the lowest danger avoiding capability (Amin) is determined from those of the workers present in the work area (step 403). Then, the danger avoiding capability (B) of the worker who is about to enter the work area is read, and is compared with the lowest danger avoiding capability (Amin) (in step 405).

If the danger avoiding capability (B) of the worker who is about to enter the work area is equal to (yes in step 406) or higher (yes in step 407) than the lowest danger avoiding capability (Amin), the aforementioned access permitting process (step 408) is executed and the worker who is about to enter the work area is permitted to do so. On the other hand, if the danger avoiding capability (B) of the worker is determined to be lower than the lowest danger avoiding capability (Amin) (no in step 407), the access permitting process (step 408) is skipped, and the worker is refused to enter the work area.

According to the entry management process (steps 401 to 408) described above, as shown in FIG. 10, when there is no preceding presence of a worker, any worker who has a higher danger avoiding capability than the actual degree of danger prevailing in the work area is permitted to enter the work area. However, as shown in FIG. 11, when there is at least one worker already present within the work area, a new worker is permitted to enter the work area only when his danger avoiding skill is equal to or higher than that of the worker already present in the work area is permitted to enter the work area. In FIGS. 10 and 11, M1 denotes a worker who is about to enter the work area 100, and M2 to M4 are workers who are already present in the work area 100.

Because the danger avoiding capability of a worker reflects the degree of danger of the particular work area in which the worker is present, if the worker M1 who is about to enter the work area has a higher danger avoiding capability than any of the workers already present within the work area, even when the worker already in the work area are performing work of a high degree of danger, the new worker M1 who is about to enter the work area can adequately avoid any such danger.

Also, the danger avoiding capability as defined herein is based on a standardized scale of evaluating a worker's skill based on his past experience and credits he earned in safety education programs and the actual degree of danger in each work area where he is permitted to enter, such an entry control can function in an appropriate way while harmonizing safety with productivity.

The details of the operation mode process (step 310) are illustrated in FIG. 5. As shown in the drawing, upon start of the process, the contents of the process are read (step 501) and the kind of the particular operation is determined (step 502).

If the kind of operation is "stop operation" (stop operation in step 502) or the kind of operation is "change mode" (change mode in step 502) and the change is not to a mode involving a higher degree of danger (no in step 503), the program flow immediately advances to an operation permitting process (step 504).

A change to a mode involving a higher degree of danger may occur, for instance, when the work machine consists of a robot and the operation mode changes from a teaching mode to a full operation mode.

In the operation permitting process (step 504), a signal that is required to enable a stop operation command or a change mode command is forwarded to the control unit 5 of the robot so that such a command is enabled when issued from the worker.

On the other hand, if the command consists of "start operation" (start operation in step 502) or "change mode" (change mode in step 502) and the change is to a mode involving a higher degree of danger (yes in step 503), the presence permitting process (step 504) is skipped, and the command issued from the worker is ignored.

If there is no prior presence of workers (no in step 506), the aforementioned operation permitting process (step 504) is executed, and the command from the worker is enabled. On the other hand, if there is a prior presence of a worker (yes in step 506), the operation permitting process (step 504) is skipped, and the command from the worker is ignored.

According to the operation process (steps 501 to 506) described above, as shown in FIG. 12, if there is no preceding presence of a worker, all of the commands including the start operation, stop operation and change mode commands are permitted. However, as shown in FIG. 13, if there is a preceding presence of a worker, the stop operation command and other commands that involve a change to an operation mode of a lower degree of danger are permitted but commands that involve a change to an operation mode of a higher degree of danger are prohibited. Therefore, the operation mode can be changed to a one involving a lower degree of danger even without vacating the work area each time. This enables an appropriate entry control for each work area, and a harmonization of safety with productivity.

In FIGS. 12 and 13, M4 denotes a worker standing in front of the control console 14, and M6 and M7 are workers present within the work area 100.

INDUSTRIAL APPLICABILITY

According to the present invention, because ID tags are used as media for exchanging information between the work machines and the worker, it is possible to exchange safety management information between the two sides in a highly fine manner. Furthermore, because the safety management information includes a work area code indicating a work area permitted to the corresponding worker and a danger avoiding capability code indicating a danger avoiding capability of the worker, the danger avoiding capability of the worker being determined from a worker skill of the corresponding worker that is evaluated in a standardized manner from past work experience of the corresponding worker and credits earned in a safety education program, and a specific degree of danger in the work area permitted to the worker, it becomes possible to finely manage the worker safety according to these codes by taking into account the changes in the states of the work machines and workers.

BRIEF DESCRIPTION OF THE DRAWINGS

FIG. 6 is a view showing a table listing the safety management information of each worker;

FIG. 7 is a diagram showing the process of generating a danger avoiding capability code;

FIG. 8 is a view showing a table listing the necessary information for the worker absence control;

FIG. 9 is a diagram showing the result of a process of selectively permitting the entry to the work area "1" for each worker;

GLOSSARY

Figure 1:
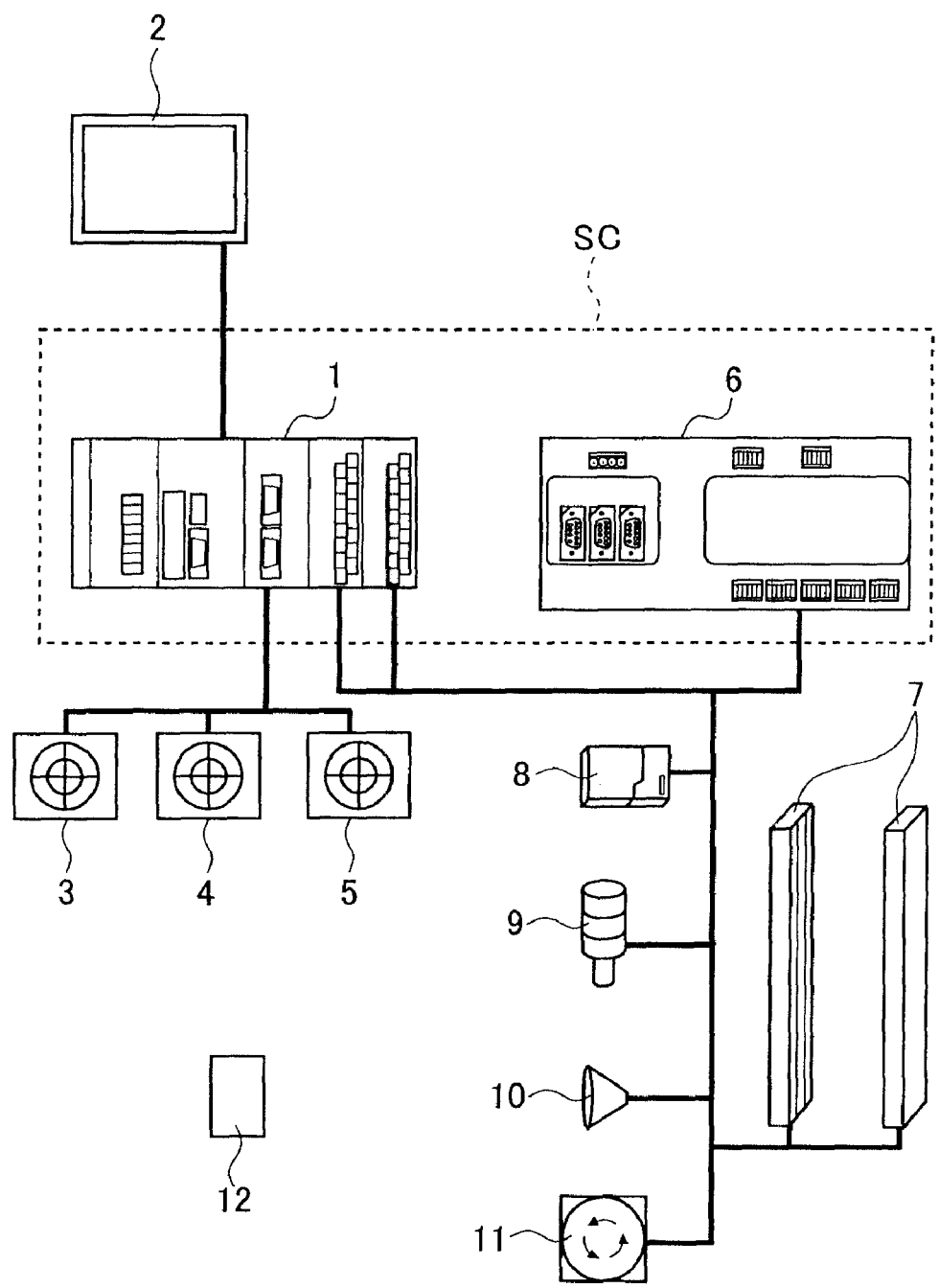
FIG. 1 is a diagram showing the overall structure of the system embodying the present invention.
Figure 2:
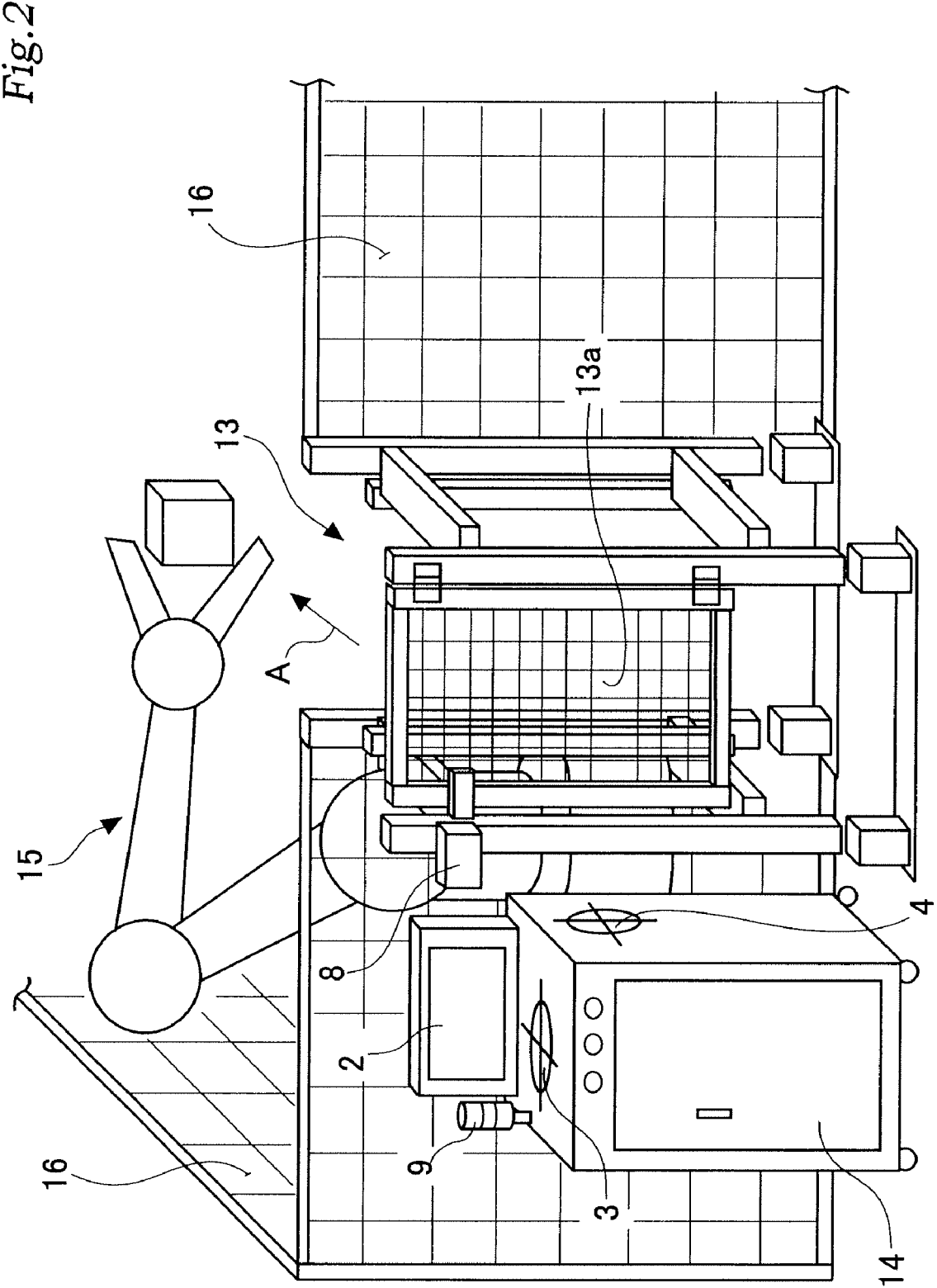
FIG. 2 is a diagram showing the gate in the work place.
Figure 3:
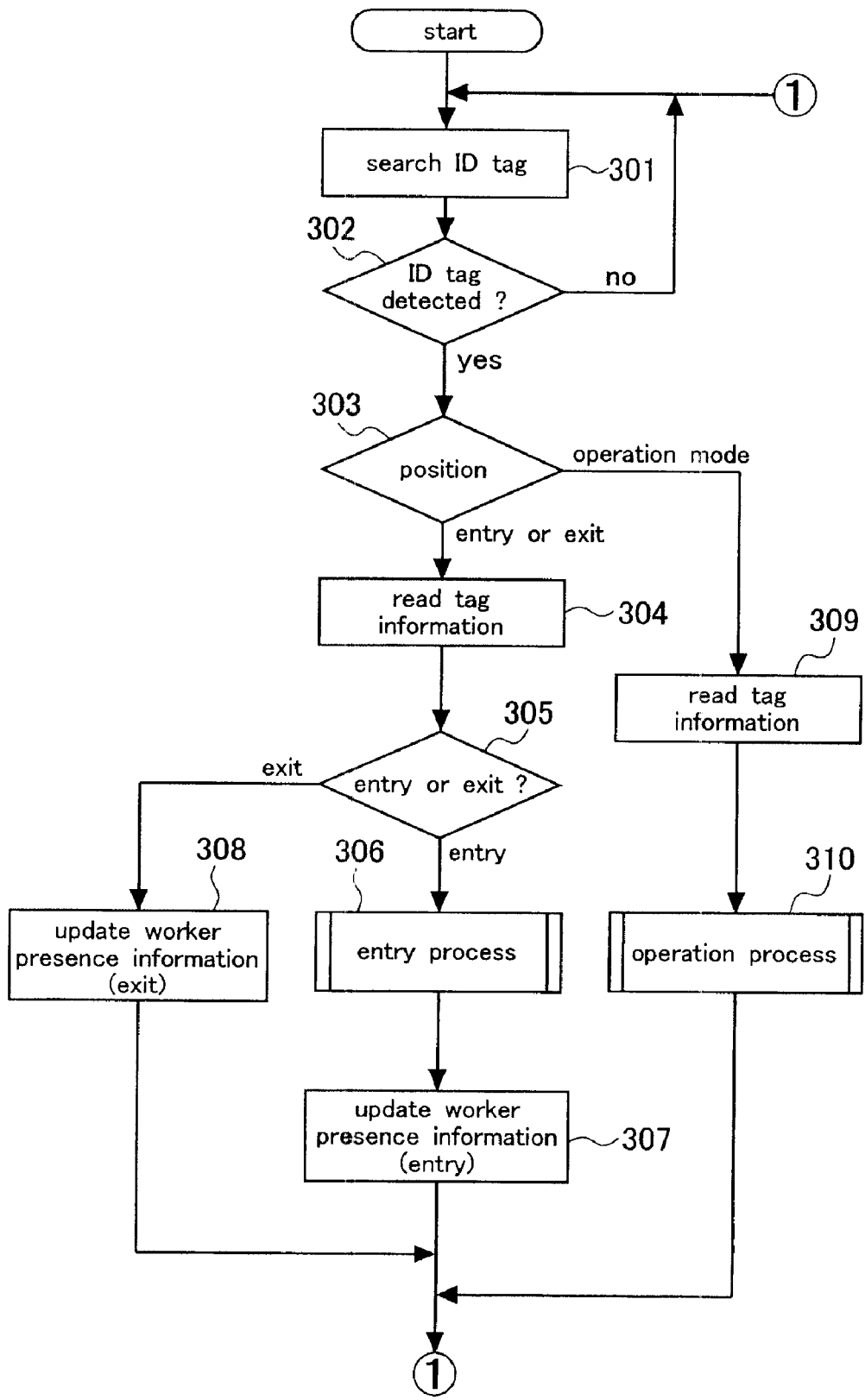
FIG. 3 is a flowchart showing the overall control process of the safety management unit.
Figure 4:
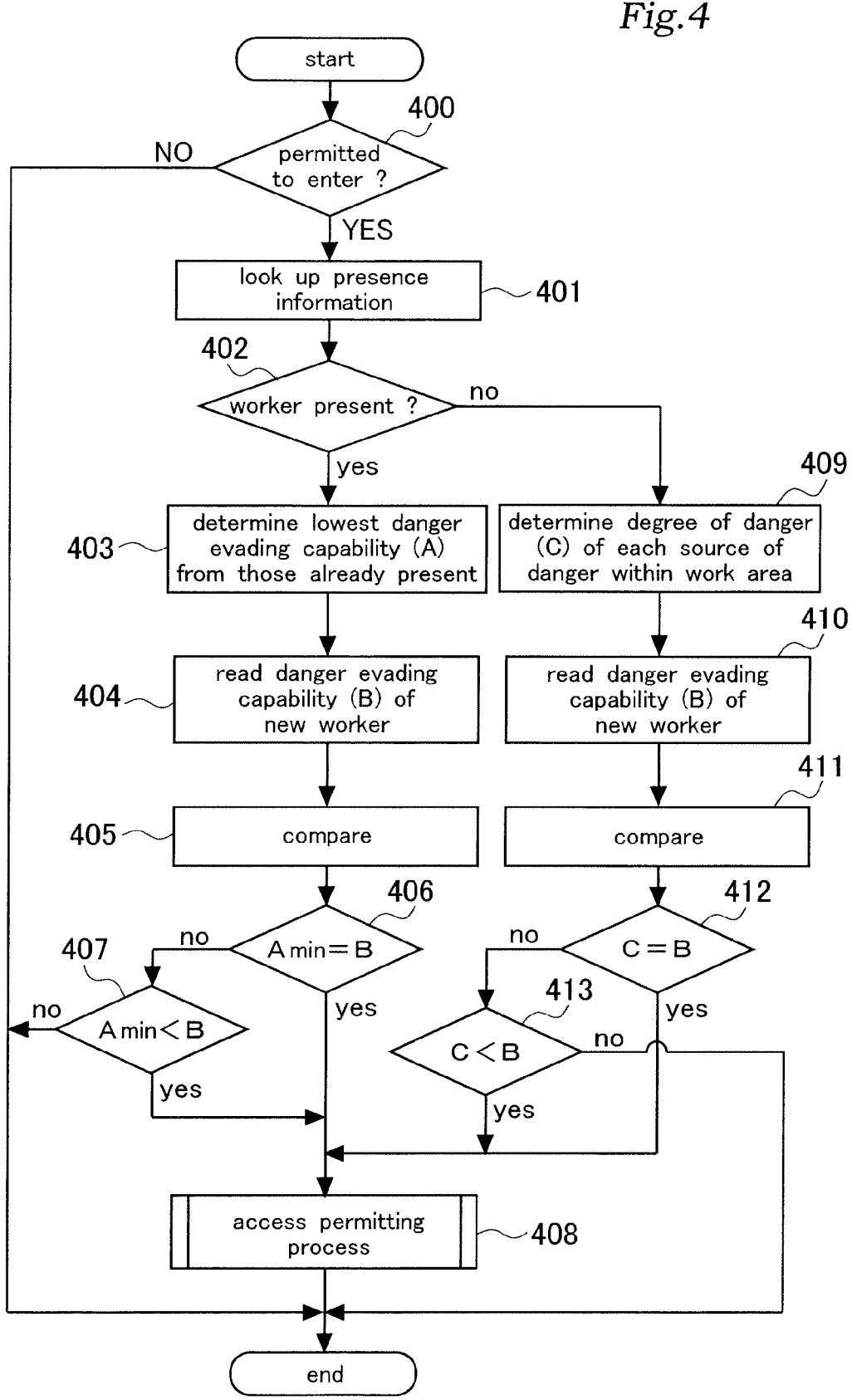
FIG. 4 is a flowchart showing the details of the worker entry process.
Figure 5:
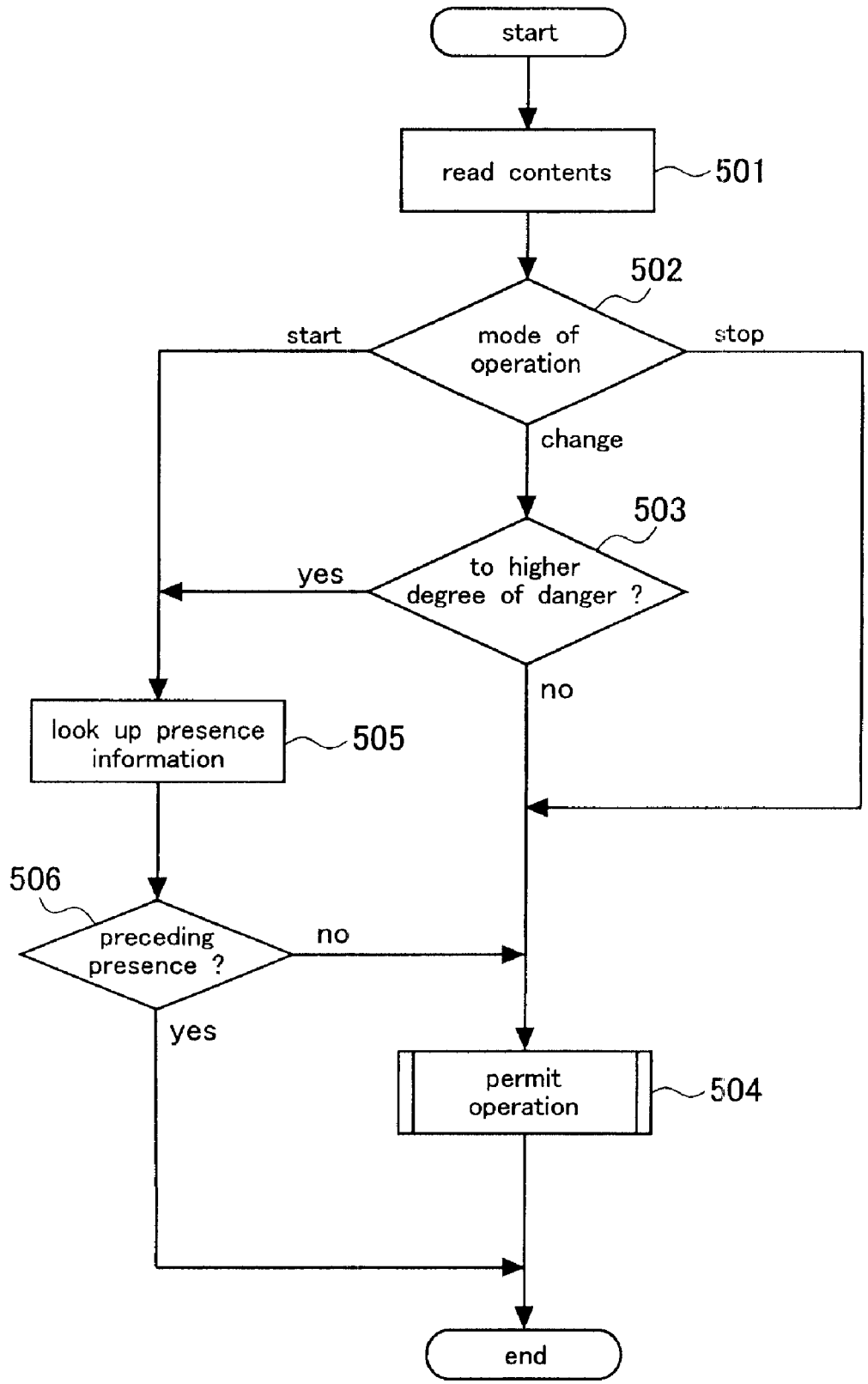
FIG. 5 is a flowchart showing the details of the operation process.
Figure 10:
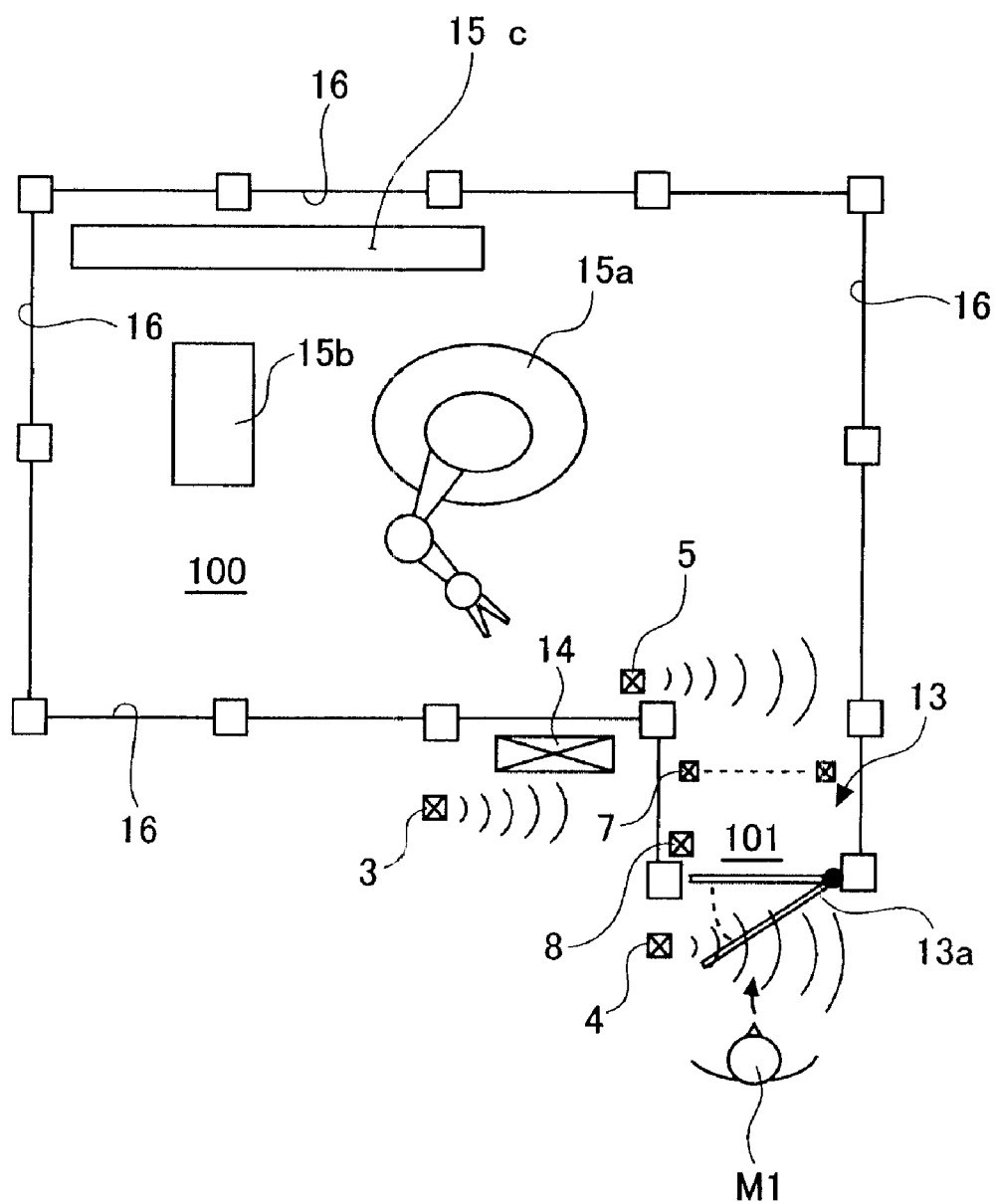
FIG. 10 is a diagram illustrating the worker entry control (when no preceding worker is present)
Figure 11:
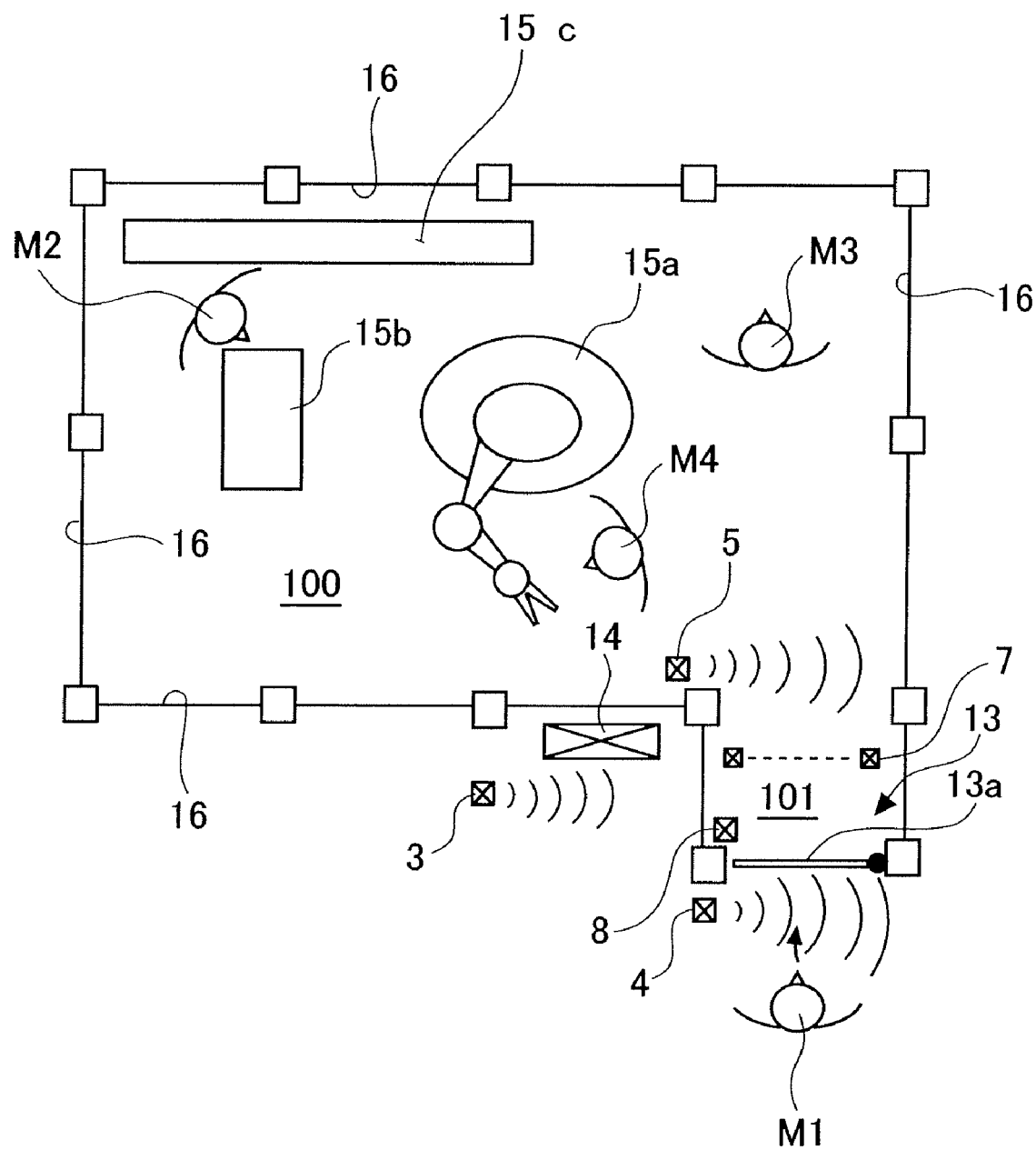
FIG. 11 is a diagram illustrating the worker entry control (when a preceding worker is present)
Figure 12:
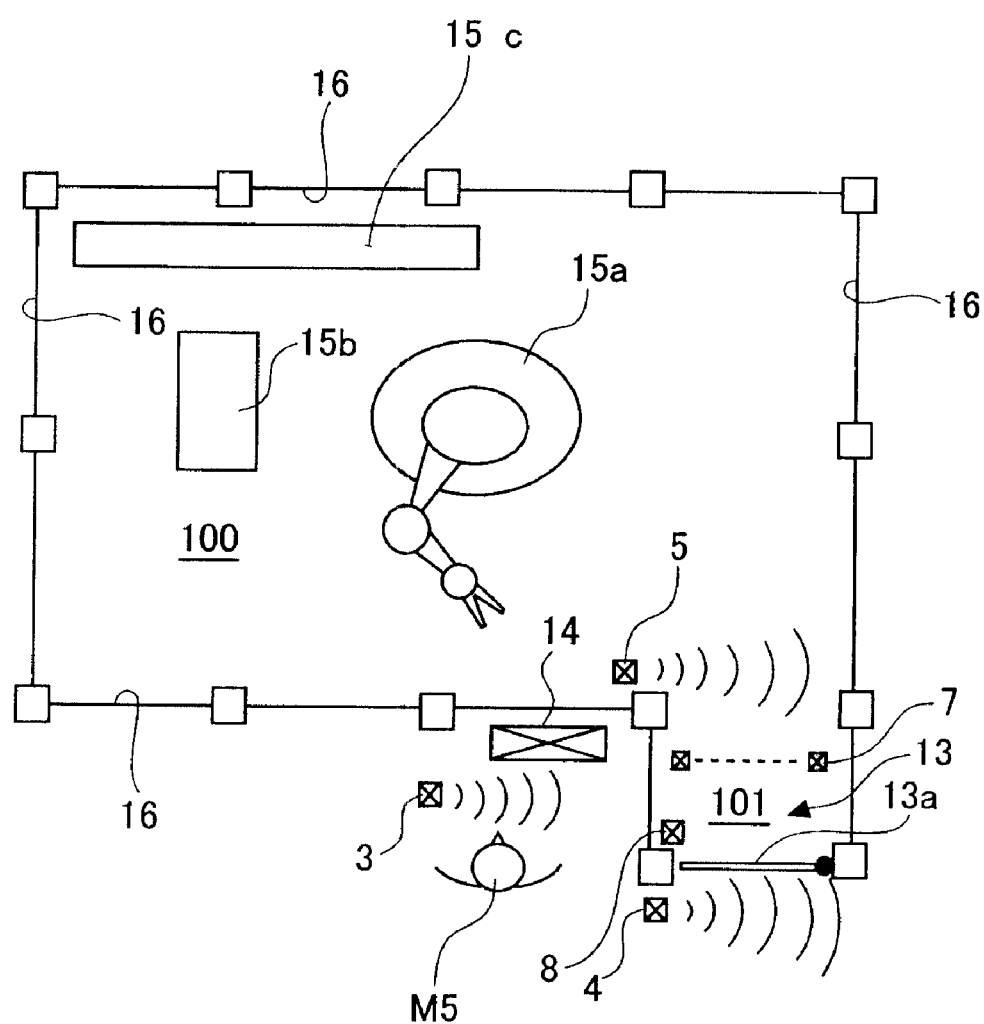
FIG. 12 is a diagram illustrating the operation control (when no preceding worker is present)
Figure 13:
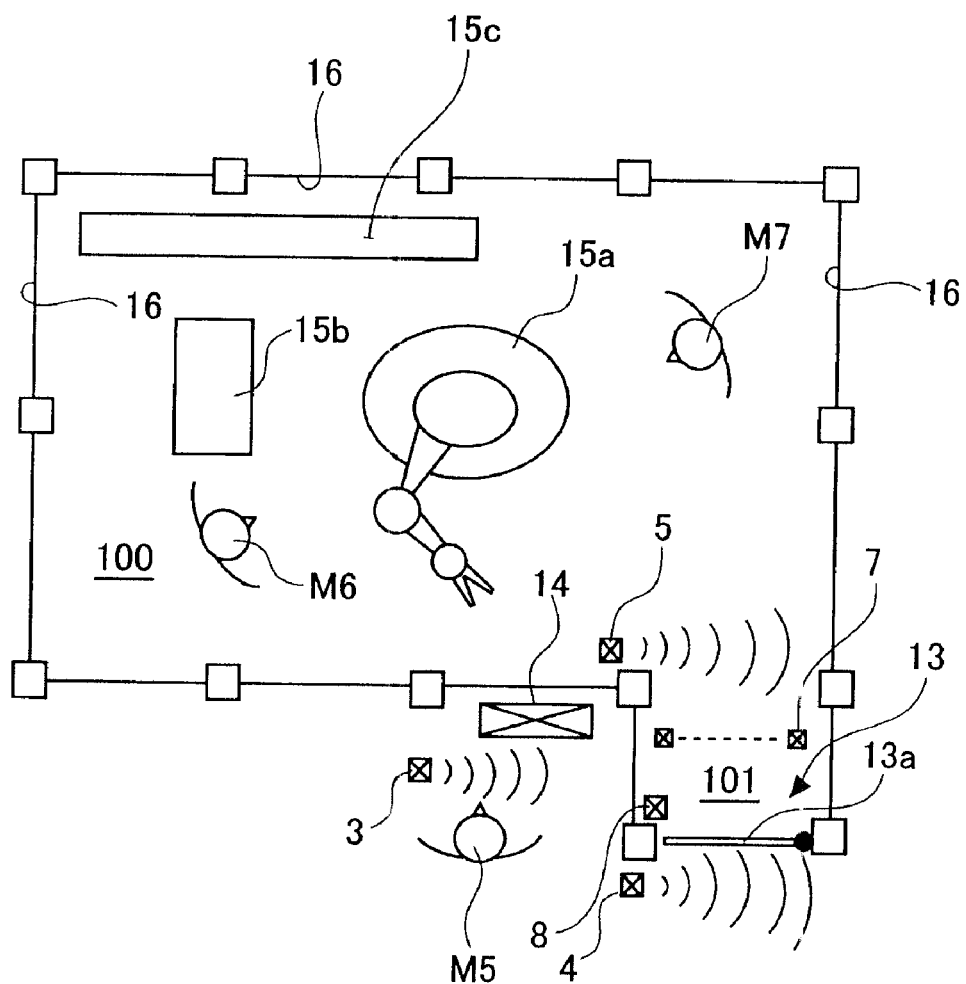
FIG. 13 is a diagram illustrating the operation control (when a preceding worker is present).

| 1 | programmable controller (PLC) | 2 | operation display unit |
|---|---|---|---|
| 3 | operator tag reader | 4 | entry tag reader |
| 5 | exit tag reader | 6 | robot control unit |
| 7 | light curtain | 8 | solenoid lock mechanism |
| 9 | revolving warning lamp | 10 | buzzer |
| 11 | emergency stop switch | 12 | RFID tag |
| 13 | gate | 13a | door |
| 14 | control console | 15a | robot |
| 15b | press | 15c | conveyer |
| 16 | protective barrier | 100 | work area |
| 101 | small hall | M1 | new worker |
| M2 to M4 | preceding worker | | |
| M5 | worker operating the control console | | |
| M6, M7 | preceding worker | SC | safety management control unit |

The invention claimed is:

1. A worker safety management system for managing safety of a worker in a work place including a designated work area that includes therein a work machine that could be a source of danger, comprising:

an ID tag carried by each worker and containing safety management information on the worker;

one or more ID tag readers placed in a suitable part of the work place to read safety management information on each worker from the ID tag carried by the corresponding worker; and a safety management control unit for executing a control on safety management of each worker according to the safety management information read from the corresponding ID tag by using the one or more ID tag readers;

wherein the safety management information stored in each ID tag includes a work area code indicating a work area permitted to the corresponding worker and a danger avoiding capability code indicating a danger avoiding capability of the worker, the danger avoiding capability indicated by the danger avoiding capability code being determined from a worker skill of the corresponding worker that is evaluated in a standardized manner from past work experience of the corresponding worker and credits earned in a safety education program, and a specific degree of danger in the work area permitted to the worker.

2. The worker safety management system according to claim 1, wherein the safety management control unit comprises:

a worker presence information generating means for generating worker presence information of a work area including a work machine according to records of worker entry and worker exit;

a worker absence control means that is executed when no worker presence is determined from the worker presence information generated by the worker presence information generating means; and a worker presence control means that is executed when worker presence is determined from the worker presence information generated by the worker presence information generating means;

wherein the worker absence control means permits a worker an access to a work area provided that the worker is verified to be permitted to work in the work area according to the worker's work area code and that a danger avoiding capability indicated by the worker's danger avoiding capability code is equal to or higher than a degree of danger associated with a work machine included in the work area; and wherein the worker presence control means permits a worker an access to a work area provided that the worker is verified to be permitted to work in the work area according to the worker's work area code and that a danger avoiding capability indicated by the worker's danger avoiding capability code is equal to or higher than a danger avoiding capability indicated by a danger avoiding capability of a worker already present in the work area based on the worker presence information generated by the worker presence information generating means;

whereby safety of the worker who seeks an access to the work area including the work machine is ensured.

3. The worker safety management system according to claim 2, wherein the work place comprises a work machine such as a robot and a machine tool, a protective barrier that delimits and surrounds a work area including the work machine and a gate provided in a part of the protective barrier and configured to be switched between a passable state and a non-passable state, a worker being permitted an access to the work area by placing the gate in the passable state.

4. The worker safety management system according to claim 1, wherein the safety management control unit comprises:

a worker presence information generating means for generating worker presence information of a work area including a work machine according to records of worker entry and worker exit;

a worker absence control means that is executed when no worker presence is determined from the worker presence information generated by the worker presence information generating means; and a worker presence control means that is executed when worker presence is determined from the worker presence information generated by the worker presence information generating means;

wherein the worker absence control means enables a start operation command, a stop operation command and a change operation mode command of the work machine; and wherein the worker presence control means enables a start operation command, a stop operation command and a change operation mode command of the work machine for a change to an operation mode involving a lower degree of danger but prohibits a change operation mode command of the work machine for a change to an operation mode involving a higher degree of danger;

whereby safety of the worker is ensured when issuing any of a start operation command, a stop operation command and a change operation mode command.

5. The worker safety management system according to claim 1, wherein the ID tag consists of an RFID tag that can be read and/or written via wireless communication.

6. A method for managing worker safety in a work place including a delimited work area containing a work machine that could be a source of danger according to safety management information stored in an ID tag carried by each worker, wherein:

the safety management information stored in each ID tag includes a work area code indicating a work area permitted to the corresponding worker and a danger avoiding capability code indicating a danger avoiding capability of the worker, the danger avoiding capability indicated by the danger avoiding capability code being determined from a worker skill of the corresponding worker that is evaluated in a standardized manner from past work experience of the corresponding worker and credits earned in a safety education program, and a specific degree of danger in the work area permitted to the worker;

the method comprising:

a worker presence information generating step of generating a worker presence information of the work area containing the work machine according to records of worker entry and worker exit;

a worker absence control executing step of executing a worker absence control when a worker absence is determined from the worker presence information generated by the worker presence information generating step; and a worker presence control executing step of executing a worker presence control when a worker presence is determined from the worker presence information generated by the worker presence information generating step;

wherein the worker absence control executing step permits a worker an access to a work area provided that the worker is verified to be permitted to work in the work area according to the worker's work area code and that a danger avoiding capability indicated by the worker's danger avoiding capability code is equal to or higher than a degree of danger associated with a work machine included in the work area; and wherein the worker presence control executing step permits a worker an access to a work area provided that the worker is verified to be permitted to work in the work area according to the worker's work area code and that a danger avoiding capability indicated by the worker's danger avoiding capability code is equal to or higher than a danger avoiding capability indicated by a danger avoiding capability of a worker already present in the work area based on the worker presence information generated by the worker presence information generating means;

whereby safety of the worker who seeks an access to the work area containing the work machine is ensured.

7. The method for managing worker safety according to claim 6, wherein the work place contains a work machine such as a robot and a machine tool, a protective barrier that delimits and surrounds a work area containing the work machine and a gate provided in a part of the protective barrier and configured to be switched between a passable state and a non-passable state, a worker being permitted an access to the work area by placing the gate in the passable state.

8. The method for managing worker safety according to claim 6, wherein the ID tag consists of an RFID tag that can be read and/or written via wireless communication.

9. A method for managing worker safety in a work place including a delimited work area containing a work machine that could be a source of danger according to safety management information stored in an ID tag carried by each worker, wherein:

the safety management information stored in each ID tag includes a work area code indicating a work area permitted to the corresponding worker and a danger avoiding capability code indicating a danger avoiding capability of the worker, the danger avoiding capability indicated by the danger avoiding capability code being determined from a worker skill of the corresponding worker that is evaluated in a standardized manner from past work experience of the corresponding worker and credits earned in a safety education program, and a specific degree of danger in the work area permitted to the worker;

the method comprising:

a worker presence information generating step of generating a worker presence information of the work area containing the work machine according to records of worker entry and worker exit;

a worker absence control executing step of executing a worker absence control when a worker absence is determined from the worker presence information generated by the worker presence information generating step; and a worker presence control executing step of executing a worker presence control when a worker presence is determined from the worker presence information generated by the worker presence information generating step;

wherein the worker absence control executing step enables a start operation command, a stop operation command and a change operation mode command of the work machine; and wherein the worker presence control executing step enables a start operation command, a stop operation command and a change operation mode command of the work machine for a change to an operation mode involving a lower degree of danger but prohibits a change operation mode command of the work machine for a change to an operation mode involving a higher degree of danger;

whereby safety of the worker is ensured when issuing any of a start operation command, a stop operation command and a change operation mode command.

\* \* \* \* \*